United States Patent [19]

Mueller et al.

[11] Patent Number: 4,923,906

[45] Date of Patent: May 8, 1990

[54] RIGID, GAS-PERMEABLE POLYSILOXANE CONTACT LENSES

[75] Inventors: Karl F. Mueller, New York; Paul Harisiades, Woodhaven, both of N.Y.

[73] Assignee: Ciba-Geigy Corporation, Ardsley, N.Y.

[21] Appl. No.: 344,158

[22] Filed: Apr. 26, 1989

Related U.S. Application Data

[63] Continuation-in-part of Ser. No. 167,806, Mar. 14, 1988, Pat. No. 4,837,289, which is a continuation-in-part of Ser. No. 45,020, Apr. 30, 1987, abandoned.

[51] Int. Cl.$^5$ .............. C08F 30/08; C08F 120/08; C08F 230/08

[52] U.S. Cl. .................. 523/107; 521/154; 522/97; 522/99; 526/279

[58] Field of Search ............ 521/154; 523/107; 526/279; 522/97, 99

[56] References Cited

U.S. PATENT DOCUMENTS 4,837,289 6/1989 Mueller et al. ............... 526/279

Primary Examiner—Morton Foelak
Attorney, Agent, or Firm—Luther A. R. Hall

[57] ABSTRACT

New polysiloxane contact lenses are described which are prepared from polysiloxanes bearing at least three polymerizable vinyl groups by copolymerization with acrylic comonomers. The new lens materials are characterized by a superior combination of high oxygen permeability and rigidity.

8 Claims, No Drawings

RIGID, GAS-PERMEABLE POLYSILOXANE CONTACT LENSES

INTRODUCTION

Unsaturated low molecular weight polymers are widely used in the resins industry, for example as UV-curable coatings and paints, or in the fabrication of molded parts. Typical examples of such unsaturated polymers are the di(meth)-acrylates obtained by reaction of a polyether or polyester diol with, first, 2 equivalents of a diisocyanate, followed by termination with an hydroxyalkyl (meth)-acrylate, as e.g. described in U.S. Pat. Nos. 3,509,234 and 4,192,827.

Polysiloxane analogs of such divinyl polymers are described in U.S. Pat. Nos. 4,136,250 and 4,486,577. Direct esterification of polymeric diols with acryloyl or methacryloyl chloride can also be used to make these polymeric di(meth)acrylates, which have found wide use in UV-curable coatings and also, with polysiloxanes as main components, in the contact lens area, because of their high oxygen permeability.

An alternate method for making these divinyl polymers is by reaction of the diol or diamine prepolymer with an unsaturated isocyanate, most commonly isocyanatoethyl methacrylate (IEM). This method has the advantage that no chain extensions can occur and no volatile components or water have to be removed. Unsaturated polymers based on this reaction have been described in U.S. Pat. Nos. 4,338,242 and 4,529,765. Unsaturated polysiloxanes made by this method are described in U.S. Pat. Nos. 4,563,539 and 4,605,712.

All these divinyl polymers give on polymerization crosslinked polymers, just like low molecular weight (MW) divinyl compounds; in the coatings industry, high MW divinyl compounds are often used alone, without the addition of highly toxic, volatile comonomers, or they are used in combination with low MW di- or tri or tetra(meth)acrylates in order to increase crosslinked density. Often such mixtures are incompatible because of differences in solubility parameters and because the relatively high MW divinyl-polymers (MW, typically range from 1000–10,000) are poorly miscible with other polymeric components.

When polysiloxane-di or tri(meth)acrylates are used to make hard, gas permeable contact lens materials, additional crosslinking agents, like ethylene glycol dimethacrylate, have often to be added to achieve sufficient rigidity. Even then, the additional hydrogen bonding chain interaction derived from multiple urethane linkages are necessary for making a high modulus polymer.

A high urethane content of the divinyl-polysiloxane prepolymer has also been found to help compatibility with many comonomers especially acrylic monomers, which are commonly used in the fabrication of contact lens materials, and in which high optical clarity is of greatest importance (U.S. Pat. No. 4,486,577).

It has now been discovered that rigid, gas-permeable contact lenses with superior hardness and oxygen permeability can be produced from polysiloxane prepolymers terminated with at least three vinyl groups by copolymerization with vinyl monomers which, when polymerized by themselves, give polymers with a glass transition temperature above 70° C.

Polyvinyl-polysiloxanes with more than two vinyl groups per polysiloxane chain useful in the context of this invention are described in copending application Ser. No. 167,806; and in U.S. Pat. No. 4,640,940, where tetramethacrylate functional polysiloxanes are described for use in fast curing compositions.

The instant copolymers of polyvinyl-polysiloxanes with high $T_g$ comonomers are superior to the polysiloxane-di(meth)acrylates of the prior art in most applications where high oxygen permeability, product stiffness and compatibility are important as in the manufacture of rigid, gas-permeable contact lenses.

DETAILED DESCRIPTION

The present invention pertains to a copolymer in the form of contact lenses, which copolymer comprises the copolymerization product of (A) 15 to 85% by weight of a polyunsaturated polysiloxane of formula I

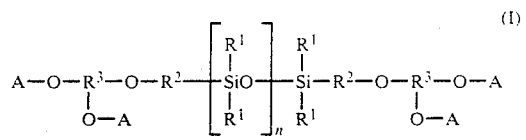

(B) 85 to 15% by weight of a comonomer or mixture thereof, which, when polymerized by itself, gives a polymer with a glass-transition temperature greater than 70° C., and which, based on the total weight of comonomer, is (B₁) 100 to 65% by weight of a water insoluble, monoolefinic monomer or mixture thereof, (B₂) 0 to 35% by weight, but not over 15% by weight of the total composition, of a water soluble monoolefinic monomer or mixture thereof, and (B₃) 0 to 50% by weight, but not over 20% of the total composition, is a di- or tri-olefinic crosslinking monomer or mixture thereof, wherein n is 5 to about 500;

at least three of A either consists of a reactive vinyl containing group of the formula

or

where $R^4$ is arylene of 6 to 12 carbon atoms, alkarylene of 7 to 14 carbon atoms, alkylene of up to 8 carbon atoms, or a group of the formula

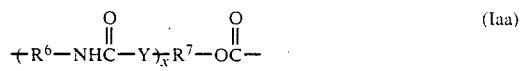

where $R^7$ is alkylene of 2 to 8 carbon atoms, x is zero or 1, Y is —O— or —NR⁸— where $R^8$ is hydrogen or alkyl of up to 4 carbon atoms, and $R^6$ is the diradical residue of an aliphatic, cycloaliphatic, aromatic or araliphatic diisocyanate; and $R^5$ is hydrogen or methyl; and the remaining A are hydrogen or said reactive vinyl containing group;

R¹ is alkyl of up to 4 carbon atoms or phenyl;
R² is alkylene of 2 to 6 carbon atoms;
R³ is an alkanetriyl radical of 3 to 6 carbon atoms.
Preferably R¹ is methyl.

When any of R² or R⁴ is alkylene, alkylene is for example ethylene, trimethylene, tetramethylene, pentamethylene, 2,2-dimethylpropane-1,3-diyl, hexamethylene, heptamethylene, octamethylene, decamethylene, 2,2-pentamethylenepropane-1,3-diyl or dodecamethylene.

When R⁴ is arylene, it is for example phenylene, phenylene substituted by one or more $C_1$-$C_4$-alkyl or is naphthylene.

When R⁴ is alkarylene, it is for example benzylene, or benzylene substituted by one or more $C_1$-$C_4$-alkyl.

The comonomers (B) useful in the context of the instant invention are essentially water insoluble vinyl monomers ($B_1$) of structures such as:

Acrylates and methacrylates of the general structure:

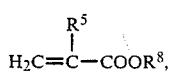

acrylamides and methacrylamides of structure:

maleates and fumarates; or itaconates of structures:

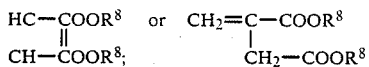

vinyl esters,

R⁸—COO—CH=CH₂ and vinyl ethers

H₂C=CH—O—R⁸ wherein R⁵ is hydrogen or methyl and R⁸ is a linear or branched aliphatic group of 1 to 5 carbon atoms, or cycloaliphatic or aromatic group with from 6 to 21 carbon atoms.

In addition, the R⁸ group may contain halogen atoms, especially fluorine in form of perfluorinated alkyl groups with from 1-12 carbon atoms. When R⁸ is in a fumarate, maleate or itaconate, one of R⁸ may be hydrogen.

Included among the useful monomers are: methyl-; isopropyl-; isobutyl-; tert.-butyl-; benzyl-; 4-tert-butylphenyl-; cyclohexyl-; trimethylcyclohexyl-; isobornyl-; dicyclopentadienyl-; norbornylmethyl-; cyclododecyl-; 1,1,3,3-tetramethylbutyl-; glycidyl; hexafluoroisopropyl-; 1,1,2,2-tetrahydroperfluorododecyl-; perfluorododecyl-; 1,1-dihydro-heptafluorobutyl acrylates and methacrylates, as well as the corresponding amides; N-(1,1-dimethyl-3-oxobutyl)acrylamide; mono- and dimethyl fumarate, maleate and itaconate; diethyl fumarate; isopropyl and diisopropyl fumarate and itaconate; mono- and diphenyl and methylphenyl fumarate and itaconate; methyl vinyl ether; acrylonitrile, styrene, alpha-methyl styrene, and tert-butylstyrene and pentafluorostyrene.

Water-soluble monomers ($B_2$) which are also useful comonomers in the present invention are: acrylates and methacrylates of the general structure:

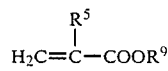

R⁹ is a hydrocarbon residue of 1 to 10 carbon atoms substituted by one or more water solubilizing groups such as carboxy, hydroxy or tert.-amino, or a polyethylene oxide group with from 2-100 repeating units, or a group which contains sulfate, phosphate, sulfonate or phosphonate groups.

Acrylamides and methacrylamides of structure

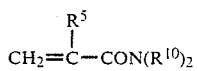

wherein R¹⁰ is independently hydrogen or an alkyl group with 1-4 carbon atoms, are also useful comonomers.

Maleates and fumarates; or itaconates of structures:

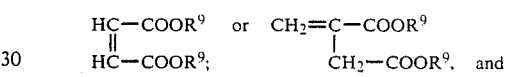

vinyl ethers of structure:

are likewise useful as comonomers as are N-vinyl-lactams, like N-vinyl-2-pyrrolidone. Included among the useful water soluble monomers are:

2-hydroxyethyl-, 2- and 3-hydroxypropyl-, 2,3-dihydroxypropyl-, polyethoxyethyl-, and polyethoxypropylacrylates and methacrylates as well as the corresponding acrylamides and methacrylamides. Sucrose-, mannose-, glucose-, sorbitol acrylates and methacrylates; and di-(-2-hydroxyethyl) maleate;

acrylamide and methacrylamide, N-methylacrylamide and methacrylamide, bisacetone-acrylamide, 2-hydroxyethyl acrylamide, N,N-dimethylacrylamide and methacrylamide, methylolacrylamide and methacrylamide; N-vinylformamide and N-vinylacetamide.

N,N-dimethyl- and N,N-diethyl-aminoethyl acrylate and methacrylate as well as the corresponding acrylamides and methacrylamides, N-tert-butylaminoethyl methacrylate and methacrylamide, 2- and 4-vinylpyridine, 4- and 2-methyl-5-vinylpyridine, N-methyl-4-vinyl piperidine, 1-vinyl- and 2-methyl-1-vinyl-imidazole, para- and ortho-aminostyrene, dimethylaminoethyl vinyl ether, N-vinylpyrrolidone, and 2-pyrrolidinoethyl methacrylate;

acrylic and methacrylic acid, itaconic-, cinnamic-, crotonic-, fumaric-, and maleic acids and lower hydroxyalkyl mono- and diesters there of, such as 2-hydroxyethyl- and di(2-hydroxy)ethyl fumarate, -maleate and -itaconate, and 3-hydroxypropyl-butyl fumarate, and di(polyalkoxy)alkylfumarates, maleates and itaconates; maleic-anhydride, sodium acrylate and methacrylate, 2-methacryloyloxyethylsulfonic acid, 2-methacrylamido-2-methyl-propanesulfonic acid, 2-phosphatoethyl methacrylate, vinylsulfonic acid, sodium vinylsulfonate, p-styrenesulfonic acid, sodium p-styrenesulfonate, and allyl sulfonic acid.

A wide range of polyvinyl crosslinking comonomers ($B_3$) can be used in addition to the monovinyl compounds. Indeed, from 0 to 50% by weight of the total monomer can be a di-or tri-olefinic monomer, for example:

Allyl acrylate and methacrylate, ethylene glycol-, diethylene glycol-, triethylene glycol- and tetraethylene glycol-, diacrylates and dimethacrylates; 1,4-butanediol diacrylate and dimethacrylate; propylene glycol diacrylate and dimethacrylate; thiodiethylene glycol diacrylate and dimethacrylate; neopentylene glycol diacrylate and dimethacrylate; trimethylolpropane tri- and tetraacrylate; pentaerythritol tri- and tetraacrylate; divinylbenzene; divinyl ether; divinyl sulfone; disiloxanyl-bis-3-hydroxy propyl diacrylate or methacrylate; bisphenol A diacrylate or dimethacrylate; dimethacrylate; methylene bisacrylamide or methacrylamide, dimethylene bisacrylamide or methacrylamide; N,N'-dihydroxyethylene bisacrylamide or methacrylamide; hexamethylene bisacrylamide or methacrylamide; allyl- and diallyl maleate, triallyl melamine, diallyl itaconate and diallyl phthalate.

It is important that the comonomers ($B_1$), ($B_2$) and ($B_3$) are selected such that, when copolymerized by themselves, they form copolymers with a glass transition temperature of at least 70° C.

For preparing hard contact lenses, the polymer comprises the crosslinked copolymerization product of (A) from 15 to 85% by weight of a polysiloxane macromer of formula I, and (B) from 85 to 15% by weight of a mixture of comonomers, which, when polymerized by themselves, give a polymer having a glass transition temperature of greater than 70° C., and which, based on the total weight of comonomers, is ($B_1$) 100 to 65% by weight of a water-insoluble monoolefinic monomer or mixture thereof, ($B_2$) 0 to 35% by weight, but not more than 15% of the total composition, of a water-soluble monoolefinic monomer or mixture thereof, and ($B_3$) 0 to 50% by weight, but not more than 20% by weight of the total composition, of a di- or tri-olefinic crosslinking monomer with a molecular weight of less than 500 or mixture thereof.

The preferred water-insoluble monomers are methyl methacrylate, cyclohexyl methacrylate, tris(trimethylsiloxanyl)silyl-propyl methacrylate, hexafluoroisopropyl methacrylate, 1,1-dihydroheptafluorobutyl methacrylate, trimethylcyclohexyl methacrylate, isobornyl methacrylate, tert-butyl-styrene, pentafluorostyrene or mixtures thereof. The preferred water-soluble monomers are 2-hydroxyethyl methacrylate, N,N-dimethylacrylamide, acrylic acid, methacrylic acid or N-vinyl-2-pyrrolidone or mixtures thereof; and the preferred di-olefinic monomers are ethylene glycol dimethacrylate and neopentyl glycol diacrylate.

A preferred embodiment of the instant polymers useful for making hard contact lenses is the polymer comprising the copolymerization product of
(A) 20 to 60% by weight of a polysiloxane of formula I where $R^1$ is methyl, $R^2$ is propylene, n is 10–200, $R^3(OA)_2$ is —$CH_2$—CH(OA)—$CH_2$—OA, A is a group of formula Ia, $R^4$ is a group of formula Iaa, and x is zero; or
where A is a group of formula Ia, $R^4$ is a group of formula Iaa, and x is 1; or
where A is a group of formula Ia, and $R^4$ is a divalent aralkylene group of 7 to 14 carbon atoms, (B) 80 to 40% by weight of a mixture of comonomers, of which, based on the total weight of comonomers, is
($B_1$) 100 to 65% by weight of a monomer or mixture thereof selected from the group consisting of methyl methacrylate, cyclohexyl methacrylate, trimethylcyclohexyl methacrylate, isobornyl methacrylate, hexafluoroisopropyl methacrylate, 1,1-dihydroheptafluorobutyl methacrylate, tert-butyl methacrylate, styrene and tert-butylstyrene,
($B_2$) 0 to 30% by weight, but not more than 15% by weight of the total composition, of a monomer or mixture thereof selected from the group consisting of acrylic acid and methacrylic acid, and
($B_3$) 0 to 20% by weight of ethylene glycol dimethacrylate or neopentyl glycol diacrylate.

A most preferred embodiment of the instant polymers comprises the copolymerization product of
(A) 25 to 50% by weight of a polysiloxane of formula I wherein $R^1$ is methyl, $R^2$ is propylene, n is 15–100, $R^3(OA)_2$ is —$CH_2CH(OA)$—$CH_2$—OA, A is a group of formula Ia, $R^4$ is a group of formula Iaa, and x is zero; or where
A is a group of formula Ia, $R^4$ is a group of formula Iaa, x is 1 and $R^6$ is a diradical residue of a cycloaliphatic diisocyanate; or where
A is a group of formula Ia, and $R^4$ is

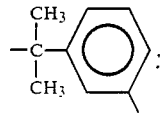

(B) 75 to 50% by weight of a mixture of comonomers, of which, based on the total weight of comonomers,
($B_1$) 80 to 95% by weight of methyl methacrylate, trimethylcyclohexyl methacrylate, hexafluoroisopropyl methacrylate, 1,1-dihydroheptafluorobutyl methacrylate or a mixture thereof, and
($B_2$) 20 to 5% by weight of methacrylic acid or acrylic acid.

SYNTHESIS

The poly-unsaturated polysiloxanes of formula I can be prepared by methods known in the art.

For example, compounds of formula I can be prepared by reacting a polysiloxane polyol of the formula

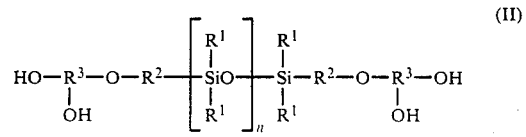

wherein R, $R^1$, $R^2$, $R^3$, and n are as defined, with an isocyanato substituted vinyl compound of the formula

where $R^4$ and $R^5$ are as defined above, preferably in the presence of a urethane catalyst such as stannous octoate or dibutyltin dilaurate, in the presence or absence of a solvent at a temperature between ambient to 80° C.

The compounds of formula II are known or can be prepared by methods known in the art, for instance as described in U.S. Pat. No. 4,689,383. They are prepared by reacting the corresponding known siloxane of the formula:

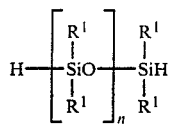

with two equivalents of an alkenyl epoxide of the formula

where $R^2_o$ represents an alkenyl group of 2 to 6 carbon atoms which, upon addition to the siloxane, forms the corresponding di-epoxide in the presence of an addition catalyst such as hexachloroplatinic acid at a temperature between about 0° C. and 80° C. in an inert solvent, and the resulting di-epoxide is hydrolyzed to the corresponding tetra-ol, of formula II where a is zero and m is zero, by contacting said di-epoxide with methanolic or aqueous base, such as an alkali metal hydroxide, at a temperature between about 0° C. and about 80° C.

Preferred compounds of formula III include 2-isocyanatoethyl methacrylate, 2-isocyanatoethyl acrylate, 3-isocyanatopropyl methacrylate, 1-methyl-2-isocyanatoethyl methacrylate, and 1,1-dimethyl-2-isocyanatoethyl acrylate.

Such compounds and their preparation are disclosed, for example, see U.S. Pat. No. 2,718,516 and British Patent No. 1,252,099. Most preferred is 2-isocyanatoethyl methacrylate.

Other useful isocyanates of formula III include isocyanato-alkyl vinyl ethers, such as 2-isocyanatobutyl vinyl ether. Also useful are isocyanates obtained by the reaction of one mole of a hydroxy- or amino alkyl acrylate or methacrylate per mole of di-isocyanate of formula VII under the conditions described above for urethane formation. Examples of useful such acrylates and methacrylates include 2-hydroxyethyl methacrylate, 2-hydroxyethyl acrylate, 3-hydroxypropyl methacrylate, or t-butylaminoethyl methacrylate and suitable di-isocyanates of formula VII include isophorone diisocyanate, 4,4,3-(3,3,4)-trimethylhexane-1,6-diisocyanate, toluene diisocyanate, diphenylmethane-4,4'-diisocyanate and the like.

Yet further preferred compounds of formula III include styrene isocyanate and m-isopropenyl-alpha,alpha-dimethylbenzyl isocyanate.

Compounds of formula I where A is of structure Ia, $R^4$ is a group of formula Iaa, and x is 1 can be prepared by reacting a polysiloxane polyol of formula II with twice the equivalent amount of a diisocyanate of formula

OCN—R⁶—NCO                (IV)

followed by reaction with an equivalent amount of a hydroxy-or amino-substituted vinyl monomer. Preferred diisocyanates are isophorone diisocyanate, 4,4,3-(3,3,4)-trimethyl-1,6-diisocyanatohexane and toluene diisocyanate.

Preferred hydroxy- and amino-substituted vinyl monomers are 2-hydroxyethyl acrylate and methacrylate, 2- and 3-hydroxypropyl acrylate and methacrylate, glycerol methacrylate, 2-hydroxyethyl vinyl ether, 4-hydroxybutyl vinyl ether, tert-butylaminoethyl methacrylate and methacrylamide, N-hydroxyethyl- and N-hydroxypropyl methacrylamide.

The reactions between the isocyanates or diisocyanates of structures III and IV with the polysiloxane-polyol (II) may be carried out neat or in solution. Where a solvent is desirable or necessary, an aprotic solvent, such as methyl ethyl ketone, isopropyl acetate, dimethylsulfoxide or sulfolane may be employed. Also, if the compound of formula I is to be copolymerized with a liquid monomer, the monomer may advantageously be employed as solvent.

The polysiloxanes of formula I are generally viscous liquids varying in number average molecular weight from about 400 to about 10,000, preferably from about 500 to about 5,000 depending on the molecular weight of the polysiloxane employed as starting material.

The polyvinyl-polysiloxanes of formula I are used together with the mentioned comonomers to make the final oxygen permeable, rigid polymers in a last synthesis step by free radical copolymerization, either in bulk or in the presence of small amounts of solvents. The polymerization is suitably carried out with a free radical generating initiator at a temperature in the range from about 40° C. to about 105° C., the preferred temperature ranges being between about 50° C. and about 100° C. These initiators are preferably peroxides or azo catalysts having half-life at the polymerization temperature of at least 20 minutes. Typical useful peroxy compounds include: isopropylpercarbonate, tert-butyl peroctoate, benzoyl peroxide, lauryl peroxide, decanoyl peroxide, acetyl peroxide, succinic acid peroxide, methyl ethyl ketone peroxide, tert-butyl peroxyacetate, propionyl peroxide, 2,4-dichloro-benzoyl peroxide, tert-butyl peroxypivalate, pelargonyl peroxide, 2,5-dimethyl-2,5-bis(2-ethylhexanoylperoxy)-hexane, p-chlorobenzoyl peroxide, tert-butylperoxy-butyrate, tert-butyl peroxymaleic acid, tert-butylperoxy-isopropyl carbonate, bis(1-hydroxycyclohexyl) peroxide; azo compounds include: 2,2-azo-bisisobutyronitrile; 2,2'-azo-bis(2,4-dimethylvaleronitrile); 1,1'-azo-bis(cyclohexanecarbonitrile); and 2,2'-azo-bis(2,4-dimethyl-4-methoxyvaleronitrile).

Other free radical generating mechanisms can be employed, such as x-rays, electron-beams and UV-radiation. Preparation of contact-lens blanks or of fully molded contact lenses by UV radiation in the presence of a photo-initiator such as diethoxyacetophenone, 1-hydroxycyclohexyl phenyl ketone, 2,2-dimethoxy-2-phenylacetophenone, phenothiazine, diisopropylxanthogen disulfide, benzoin and benzoin derivatives is a preferred method.

The amount of initiator can vary from 0.002% to 1% by weight of the monomer and macromer, but is preferably from 0.03 to 0.3% by weight thereof.

A preferred laboratory method of preparing the polymer, in the form of a cylinder, comprises the filling of a glass cylinder or flexible polymer tubing with the preferred composition of macromer, monomers, and initiator and reacting the mixture during a slowly rising temperature program for 2 to 48 hours. The finished article is removed by slitting the tubing longitudinally and stripping it away from the polymer article.

Another preferred method for preparing the polymer is by irradiation with ultraviolet light in the presence of a photo-initiator and using plastic molds which are UV transparent, such as molds made of polypropylene or other UV-permeable plastics.

The reaction is preferably carried out in an inert atmosphere if done in open molds. It is known that oxygen inhibits polymerization and gives rise to extended polymerization times. If closed molds are used to form the article, the molds are composed of inert materials having low oxygen permeability and non-stick properties. Examples of suitable molding materials are poly(tetrafluoroethylene), such as Teflon®, silicone rubber, polyethylene, polypropylene and polyester, such as MYLAR®. Glass and metallic molds may be used if a suitable mold-releasing agent is employed.

The polysiloxane-copolymers of this invention may also be treated by any of the commonly used methods used to increase the wettability of hydrophobic surfaces, such as plasma-treatment and irradiation-grafting and oxidation.

The contact lenses made from the polymers of this invention are fillerless, hydrolytically stable, biologically inert, transparent and sufficiently permeable to oxygen to allow the transport of oxygen generally sufficient to meet the requirements of the human cornea.

The following examples are presented for the purpose of illustration only and are not to be construed to limit the nature and scope of the instant invention in any manner whatsoever.

In the following examples, specific oxygen permeability ($O_2$-DK) is determined by measuring oxygen permeability at indicated temperatures and thickness with a CREATECH PERMEOMETER, using a polarographic electrode in an air-saturated aqueous environment and is expressed in units:

$$O_2\text{-}DK = \frac{cm^3(STP) \times cm}{cm^2 \times sec\text{-}cmHg} \times 10^{10} \text{ (barrers)}$$

As reference materials for $O_2$-DK measurements, water swollen poly(2-hydroxyethyl methacrylate) (poly-hema; 39% water content; a common soft-lens material) and CAB, cellulose-acetate-butyrate (an oxygen-permeable hard-lens material) are used; for hardness CAB and poly(methyl methacrylate) are used as reference materials. The $O_2$-DK, Shore-D and contact angle values for these materials are given below.

Hardness is determined using a Shore-D durometer on polished surfaces of center cut buttons of 10 mm diameter and 8 mm height.

| Reference Material | $O_2$-DK | Shore-D |
|---|---|---|
| poly-hema (39% H$_2$O) | 7.5 | — |
| poly(methyl methacrylate) | <0.1 | 92 |
| cellulose-acetate-butyrate | 8.2 | 80 |

EXAMPLE 1

26.7 g (0.0872 eqv. of hydroxy groups of a polysiloxane-dialkyltetrol (MW 1226) of the structure of formula II, $R^1$ is methyl, $R_2$ is —CH$_2$CH$_2$CH$_2$— and each —$R^3$-(OH)$_2$ is HOCH$_2$CH(OH)CH$_2$—, n=about 12 are mixed in a reaction flask with 13.5 g (0.0871 mol) isocyanatoethylmethacrylate (IEM, from DOW Chem. Corp.) and 0.02 g dibutyltindilaurate (DBTL). The mixture is stirred under a dry nitrogen blanket at 50° C. until all NCO groups have disappeared, as determined by IR spectroscopy. The slightly more viscous reaction product, consisting of a polysiloxane terminated on both ends with bis-methacrylatealkyl groups, is stored in the dark under nitrogen.

EXAMPLE 2

64.50 g (0.064 hydroxy eqv) of a polysiloxanedialkyltetrol (MW 4031), identical to that of Example 1, except that n=approximately 52 are mixed in a reaction flask with 13.28 g (0.064 eqv) m-isopropenyl-alpha,alphadimethylbenzyl isocyanate (m-TMI, from Am. Cyan. Co.) and 0.028 g DBTL. The mixture is stirred under dry nitrogen at 24° C. until all NCO has disappeared, as determined by IR. The clear, viscous reaction-product, consisting of a polysiloxane terminated at both ends with urethane connected bis-alpha-dimethyl styryl groups is stored in the dark under nitrogen.

EXAMPLES 3 AND 4

Using the same procedure as described in Example 1, polysiloxane tetramethacrylates are prepared by reacting the reactants listed in the table, wherein the polysiloxanedialkyltetrols are identical to Example 1 except for the value of n:

| Ex. | n | Polysiloxane-Tetrol MW | g | eqv. | IEM g | mol |
|---|---|---|---|---|---|---|
| 3 | 40 | 3404 | 19.4 | 0.0228 | 3.53 | 0.0227 |
| 4 | 77 | 6287 | 19.0 | 0.0121 | 1.07 | 0.0120 |

EXAMPLES 5-9

Synthesis of polymers useful as oxygen permeable hard contact lenses:

50 g of the PDMS-tetramethacrylate of Example 1 are dissolved in 50 g freshly distilled methyl methacrylate (MMA) together with 0.02 g benzoin methyl ether (BME). The mixtures are degassed three times in vacuo and under a nitrogen blanket, filled into round polypropylene button molds of 1 cm height and 1 cm diameter. The molds are exposed to UV light for 5 hours, then heated to 100° C. and allowed to slowly cool to room-temperature. 0.2 mm thick slices are cut and polished and their oxygen permeability is determined to be 20 (barrers), with a Shore-D hardness of 74.

Using the same procedure the following polymers are prepared and their hardness and oxygen permeability measured:

| Ex. No. | Tetra-MA of EX. | Composition % | MMA | TMMA* | Shore-D hardness | $O_2$-DK (barrers) 0.25 mm/ 22° C. |
|---|---|---|---|---|---|---|
| 5 | 1 | 50 | — | 50 | 73 | 28 |
| 6 | 3 | 40 | 60 | — | 79 | 36 |
| 7 | 4 | 40 | 60 | — | 73 | 78 |
| 8 | 3 | 40 | — | 60 | 75 | 44 |
| 9 | 2 + 3 (1:1) | 40 | 60 | — | 77 | 52 |

*TMMA is trimethylcyclohexyl methacrylate

EXAMPLES 10-21

Using the procedure of Ex. 5 the following polymers are prepared and their physical properties determined. All samples contain 9% methacrylic acid.

| Ex. No. | Composition tetra MA of EX. | % | Comonomer[1] | Shore-D hardness | O$_2$-DK (barrers) at 0.25 mm and 22° C. |
|---|---|---|---|---|---|
| 10 | 3 | 40 | MMA | 51 | 79 | 35 |
| 11 | 3 | 40 | TMMA | 51 | 77 | 41 |
| 12 | 3 | 40 | IBMA | 51 | 79 | 33 |
| 13 | 3 | 40 | CYMA | 51 | 78 | 29 |
| 14 | 3 | 38 | MMA | 53 | 80 | 32 |
| 15 | 3 | 38 | TMMA | 53 | 78 | 35 |
| 16 | 3 | 38 | IBMA | 53 | 80 | 29 |
| 17 | 3 | 35 | MMA | 56 | 81 | 22 |
| 18 | 3 | 35 | TMMA | 56 | 80 | 23 |
| 19 | 4 | 40 | CYMA | 51 | 72 | 55 |
| 20 | 4 | 40 | MMA | 51 | 70 | 61 |
| 21 | 4 | 40 | TMMA | 51 | 71 | 53 |

[1] MMA methyl methacrylate
TMMA trimethylcyclohexyl methacrylate
IBMA isobornyl methacrylate
CYMA cyclohexyl methacrylate

EXAMPLES 22-25

Using the same procedure as described in Ex. 5 the following polymers are prepared and their physical properties determined. All samples contain 9% methacrylic acid. TMMA is trimethylcyclohexyl methacrylate; HFMA is hexafluoroisopropyl methacrylate.

| Ex. | Composition (%) tetra-MA of Ex. 1 % | TMMA % | HFMA % | Shore-D Hardness | O$_2$-DK (barrers) at 0.25 mm and 22° C. |
|---|---|---|---|---|---|
| 22 | 55 | 36 | — | 82 | 17.5 |
| 23 | 55 | 20 | 16 | 79 | 25.8 |
| 24 | 55 | 15 | 21 | 79 | 29.8 |
| 25 | 55 | 10 | 26 | 79 | 37.1 |

EXAMPLE 26

The tetra-styryl PDMS macromer of Ex. 2 is used to make a polymer according to the procedure described in Ex. 5 with the following composition and properties:
38% PDMS-tetra-styryl of Ex. 2;
53% MMA
9% Methacrylic acid
Shore-D hardness: 82; O$_2$-DK (barrers): 25 (0.25 mm/22° C.).

EXAMPLES 27 AND 28

Following the procedure of Ex. 5 the following two polymers are synthesized and evaluated:
Compositions:

| Ex. 27: | 35% PDMS-tetramethacrylate of Ex. 3 |
| | 48% MMA |
| | 8% hexafluoroisopropyl methacrylate (HFMA) |
| | 9% methacrylic acid (MAA) |
| Ex. 28: | 30% PDMS-macromer of Ex. 3 |
| | 53% MMA |
| | 8% HFMA |
| | 9% MAA |

|  | Ex. 27 | Ex. 28 |
|---|---|---|
| Shore D hardness | 81 | 84 |
| O$_2$-DK (barrers) (0.25 mm/22° C.) | 32 | 20 |

EXAMPLES 29-31

The polymers of Ex. 10, 20 and 17 are prepared in form of 1 mm thick sheets by casting them in a MYLAR lined glass mold, using a 1 mm silicone-cord spacer and held together by clamps. The sheets are tested for physical properties on an INSTRON testing apparatus.

| Ex. No. | Pol. of Ex. | MW of tetrol | Tensile Str. (Kg/mm$^2$) | Youngs Mod. | Elongation (%) |
|---|---|---|---|---|---|
| 29 | 10 | 3404 | 3.62 | 85.2 | 17.3 |
| 30 | 20 | 6287 | 3.11 | 68.6 | 21.7 |
| 31 | 17 | 3404 | 3.73 | 80.1 | 8.6 |

EXAMPLES 32-33

Using the procedure of Example 5, the copolymers listed in the following table are prepared and their properties measured. All polymers contain 9% methacrylic acid.

| Example | Composition (%) PDMS-tetra methacrylate of Example 1 | HFMA | NPDA | Shore-D Hardness | O$_2$-DK (barrers) at 24° C. and 0.25 mm |
|---|---|---|---|---|---|
| 32 | 55 | 36 | — | 78 | 40 |
| 33 | 55 | 20 | 16 | 80 | 72 |

HFMA is hexafluoroisopropyl methacrylate
NPDA is neopentyl glycol diacrylate

EXAMPLES 34-35

Step I:
A polydimethylsiloxane tetraol, identical to that of Example 1, but with a molecular weight of 3557,.(71.14 grams, 0.02 mole) is mixed in a reaction flask with 17.76 grams (0.08 mole) of isophorone diisocyanate and 0.03 gram of dibutyltin dilaurate. The mixture is stirred under a dry nitrogen blanket for 21 hours at 25° C. The viscous isocyanate-capped PDMS product has an equivalent weight of 1069 (3.93% NCO content) as found by titration. This product (84.9 grams) is dissolved in 28.3 grams of methyl methacrylate yielding a 75% solution.

Step IIA (Example 34)
The 75% solution prepared in Step I (82.6 grams) which contains 61:9 grams (0.0579 equivalents) of isocyanate-capped PDMS is mixed with 7.91 grams (0.0608 mole) of 2-hydroxyethyl methacrylate and 2.63 grams of methyl methacrylate. The mixture is then stirred for 18 hours at 25° C. under a dry nitrogen blanket till all NCO functionality has disappeared as determined by IR analysis.

Step IIb (Example 35)
Using the same procedure as in Step IIa, 30.7 grams of the 75% solution of Step I containing 23.03 grams (0.0215 equivalent) of isocyanate-capped PDMS in methyl methacrylate is mixed with 4.19 grams (0.0226 mol) of tert-butylaminoethyl methacrylate and 1.4 gram of methyl methacrylate. The reactants are stirred for 18 hours at 25° C. till all NCO functionality has disappeared as determined by infrared analysis.

EXAMPLES 36-41

Following the procedure of Example 5, the PDMS-tetramethacrylates of Examples 34 and 35 are used to prepare copolymers with the compositions and properties listed in the table below. All polymers contain 9% methacrylic acid component.

| Example | PDMS-tetra-methacrylate of Ex. | % | HFMA | MMA | NDPA | Shore-D Hardness | O₂-DK (barrers) 24° C. and 0.3 mm |
|---|---|---|---|---|---|---|---|
| 36 | 34 | 35 | — | 56 | — | 82 | 13 |
| 37 | 34 | 35 | — | 40 | 16 | 82 | 20 |
| 38 | 35 | 35 | — | 56 | — | 81 | 25 |
| 39 | 35 | 35 | — | 40 | 16 | 81 | 28 |
| 40 | 34 | 35 | 28 | 12 | 16 | 80 | 26 |
| 41 | 35 | 35 | 28 | 12 | 16 | 78 | 30 |

HFMA is hexafluoroisopropyl methacrylate
MMA is methyl methacrylate
NPDA is neopentyl glycol diacrylate

EXAMPLES 42 AND 43

Following the procedure of Example 5, the following polymers are synthesized in form of buttons and evaluated. All procedures contain 9% methacrylic acid.

| Example No. | PDMS-tetra-methacrylate of Example 3 | HFMA | FBMA | TMMA | Shore-D hardness | O₂-DK (barrers) at 24° C./0.25 mm |
|---|---|---|---|---|---|---|
| 42 | 35 | 28 | — | 28 | 74 | 74 |
| 43 | 40 | 28 | — | 23 | 70 | 96 |
| 44 | 40 | — | 35 | 16 | 68 | 105 |

HFMA is hexafluoroisopropyl methacrylate
FBMA is 1,1-dihydroheptafluorobutyl methacrylate
TMMA is trimethylcyclohexyl methacrylate

What is claimed is:
1. A contact lens prepared from an oxygen permeable copolymer which comprises the copolymerization product of
(A) 15 to 85% by weight of a polyunsaturated polysiloxane of formula I

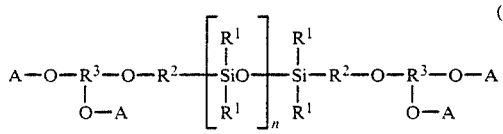

wherein
n is 5 to about 500;
at least three of A either consists of a reactive vinyl containing group of the formula

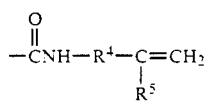

or

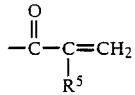

where $R^4$ is arylene of 6 to 12 carbon atoms, alkarylene of 7 to 14 carbon atoms, alkylene of up to 8 carbon atoms, or a group of the formula

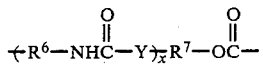

where $R^7$ is alkylene of 2 to 8 carbon atoms, x is zero or 1, Y is —O— or —NR⁸— where $R^8$ is hydrogen or alkyl of up to 4 carbon atoms, and $R^6$ is the diradical residue of an aliphatic, cycloaliphatic, aromatic or araliphatic diisocyanate; and $R^5$ is hydrogen or methyl; and the remaining A are hydrogen or said reactive vinyl containing group;
$R^1$ is alkyl of up to 4 carbon atoms or phenyl;
$R^2$ is alkylene of 2 to 6 carbon atoms;
$R^3$ is an alkanetriyl radical of 3 to 6 carbon atoms, and
(B) 85 to 15% by weight of a comonomer or mixture thereof, which, when polymerized by itself, gives a polymer with a glass-transition temperature greater than 70° C., and which, based on the total weight of comonomer, is
(B₁) 100 to 65% by weight of a water insoluble, monoolefinic monomer or mixture thereof,
(B₂) 0 to 35% by weight, but not over 15% by weight of the total composition, of a water soluble monoolefinic monomer or mixture thereof, and
(B₃) 0 to 50% by weight, but not over 20% of the total composition, is a di- or tri-olefinic crosslinking monomer or mixture thereof.
2. A contact lens according to claim 1 which is the copolymerization product of
(A) 15 to 85% by weight of a polysiloxane macromer of formula I, and
(B) 85 to 15% by weight of a mixture of comonomers which, when polymerized by themselves, give a polymer having a glass transition temperature of greater than 70° C., and which, based on the total weight of comonomers, is
(B₁) 100 to 65% by weight of a water-insoluble monoolefinic monomer or mixture thereof,
(B₂) 0 to 35% by weight, but not more than 15% of the total composition, of a water-soluble monoolefinic monomer or mixture thereof, and
(B₃) 0 to 50% by weight, but not more than 20% by weight of the total composition, of a di- or tri-olefinic crosslinking monomer with a molecular weight of less than 500 or a mixture thereof.
3. A contact lens according to claim 1 which is the copolymerization product of
(A) 20 to 60% by weight of a polysiloxane of formula I where $R^1$ is methyl, $R^2$ is propylene, n is 10–200, $R^3(OA)_2$ is —CH₂—CH(OA)—CH₂—OA, A is a group of formula Ia, $R^4$ is a group of formula Iaa, and x is zero; and (B) 80 to 40% by weight of a mixture of comonomers, of which, based on the total weight of comonomers, is (B$_1$) 100 to 65% by weight of a monomer or mixture thereof selected from the group consisting of methyl methacrylate, cyclohexyl methacrylate, trimethylcyclohexyl methacrylate, isobornyl methacrylate, hexafluoroisopropyl methacrylate, 1,1-dihydroheptafluorobutyl methacrylate, tert-butyl methacrylate, styrene and tert-butylstyrene, (B$_2$) 0 to 30% by weight, but not more than 15% by weight of the total composition, of a monomer or mixture thereof selected from the group consisting of acrylic acid and methacrylic acid, and (B$_3$) 0 to 20% by weight of ethylene glycol dimethacrylate or neopentyl glycol diacrylate.

4. A contact lens according to claim 1 which is the copolymerization product of (A) 20 to 60% by weight of a polysiloxane of formula I where R$^1$ is methyl, R$^2$ is propylene, n is 10–200, R$^3$(OA)$_2$ is —CH$_2$—CH(OA)—CH$_2$—OA, A is a group of formula Ia, R$^4$ is a group of formula Iaa, and x is 1; and (B) 80 to 40% by weight of a mixture of comonomers, of which, based on the total weight of comonomers, is (B$_1$) 100 to 65% by weight of a monomer or mixture thereof selected from the group consisting of methyl methacrylate, cyclohexyl methacrylate, trimethylcyclohexyl methacrylate, isobornyl methacrylate, hexafluoroisopropyl methacrylate, 1,1-dihydroheptafluorobutyl methacrylate, tert-butyl methacrylate, styrene and tert-butylstyrene, (B$_2$) 0 to 30% by weight, but not more than 15% by weight of the total composition, of a monomer or mixture thereof selected from the group consisting of acrylic acid and methacrylic acid, and (B$_3$) 0 to 20% by weight of ethylene glycol dimethacrylate or neopentyl glycol diacrylate.

5. A contact lens according to claim 1 which is the copolymerization product of (A) 20 to 60% by weight of a polysiloxane of formula I where R$^1$ is methyl, R$^2$ is propylene, n is 10–200, R$^3$(OA)$_2$ is —CH$_2$—CH(OA)—CH$_2$—OA, A is a group of formula Ia, R$^4$ is a divalent aralkylene group of 7 to 14 carbon atoms, and (B) 80 to 40% by weight of a mixture of comonomers, of which, based on the total weight of comonomers, is (B$_1$) 100 to 65% by weight of a monomer or mixture thereof selected from the group consisting of methyl methacrylate, cyclohexyl methacrylate, trimethylcyclohexyl methacrylate, isobornyl methacrylate, hexafluoroisopropyl methacrylate, 1,1-dihydroheptafluorobutyl methacrylate, tert-butyl methacrylate, styrene and tert-butylstyrene, (B$_2$) 0 to 30% by weight, but not more than 15% by weight of the total composition, of a monomer or mixture thereof selected from the group consisting of acrylic acid and methacrylic acid, and (B$_3$) 0 to 20% by weight of ethylene glycol dimethacrylate or neopentyl glycol diacrylate.

6. A contact lens according to claim 1 which is the copolymerization product of (A) 25 to 50% by weight of a polysiloxane of formula I wherein R$^1$ is methyl, R$^2$ is propylene, n is 15–100, R$^3$(OA)$_2$ is —CH$_2$CH(OA)—CH$_2$—OA, A is a group of formula Ia, R$^4$ is a group of formula Iaa, and x is zero; and (B) 75 to 50% by weight of a mixture of comonomers, of which, based on the total weight of comonomers, (B$_1$) 80 to 95% by weight of methyl methacrylate, trimethylcyclohexyl methacrylate, hexafluoroisopropyl methacrylate, 1,1-dihydroheptafluorobutyl methacrylate or a mixture thereof, and (B$_2$) 20 to 5% by weight of methacrylic acid or acrylic acid.

7. A contact lens according to claim 1 which is the copolymerization product of (A) 25 to 50% by weight of a polysiloxane of formula I wherein R$^1$ is methyl, R$^2$ is propylene, n is 15–100, R$^3$(OA)$_2$ is —CH$_2$CH(OA)—CH$_2$—OA, A is a group of formula Ia, R$^4$ is a group of formula Iaa, x is 1, and R$^6$ is a diradical residue of a cycloaliphatic diisocyanate; and (B) 75 to 50% by weight of a mixture of comonomers, of which, based on the total weight of comonomers, (B$_1$) 80 to 95% by weight of methyl methacrylate, trimethylcyclohexyl methacrylate, hexafluoroisopropyl methacrylate, 1,1-dihydroheptafluorobutyl methacrylate or a mixture thereof, and (B$_2$) 20 to 5% by weight of methacrylic acid or acrylic acid.

8. A contact lens according to claim 1 which is the copolymerization product of (A) 25 to 50% by weight of a polysiloxane of formula I wherein R$^1$ is methyl, R$^2$ is propylene, n is 15–100, R$^3$(OA)$_2$ is —CH$_2$CH(OA)—CH$_2$—OA, A is a group of formula Ia, and R$^4$ is

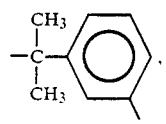

and (B) 75 to 50% by weight of a mixture of comonomers, of which, based on the total weight of comonomers, (B$_1$) 80 to 95% by weight of methyl methacrylate, trimethylcyclohexyl methacrylate, hexafluoroisopropyl methacrylate, 1,1-dihydroheptafluorobutyl methacrylate or a mixture thereof, and (B$_2$) 20 to 5% by weight of methacrylic acid or acrylic acid.

* * * * *